United States Patent
Huang et al.

(10) Patent No.: US 7,779,279 B2
(45) Date of Patent: Aug. 17, 2010

(54) POWER SUPPLY SYSTEM FOR CPU WHERE AN OLD GENERATION CPU CONFORMS TO A SECOND STANDARD AND A NEW GENERATION CPU CONFORMS TO A FIRST STANDARD

(75) Inventors: Sheng-Chung Huang, Taipei (TW); Li-Chung Wang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 593 days.

(21) Appl. No.: 11/740,294

(22) Filed: Apr. 26, 2007

(65) Prior Publication Data
US 2007/0300087 A1 Dec. 27, 2007

(30) Foreign Application Priority Data
Jun. 26, 2006 (TW) .............................. 95122900 A

(51) Int. Cl.
*G06F 1/00* (2006.01)
*G05F 1/00* (2006.01)

(52) U.S. Cl. .................. 713/310; 713/300; 323/282

(58) Field of Classification Search .................. 713/310
See application file for complete search history.

(56) References Cited

U.S. PATENT DOCUMENTS

| | | | | |
|---|---|---|---|---|
| 6,035,407 A * | 3/2000 | Gebara et al. ............... | 713/300 |
| 6,574,739 B1 * | 6/2003 | Kung et al. .................. | 713/322 |
| 6,732,266 B1 * | 5/2004 | Anderson et al. ........... | 713/100 |
| 6,772,356 B1 * | 8/2004 | Qureshi et al. .............. | 713/321 |
| 6,836,848 B2 * | 12/2004 | Yu et al. ...................... | 713/300 |
| 7,268,527 B2 * | 9/2007 | Horner ........................ | 323/285 |
| 7,366,928 B2 * | 4/2008 | Park ............................ | 713/310 |
| 7,449,874 B2 * | 11/2008 | Seliverstov ................. | 323/351 |
| 7,516,338 B2 * | 4/2009 | Park ............................ | 713/300 |

* cited by examiner

*Primary Examiner*—Suresh K Suryawanshi
(74) *Attorney, Agent, or Firm*—Jianq Chyun IP Office

(57) ABSTRACT

A power supply system for CPU is disclosed. The CPU includes a plurality of dynamic voltage identification (VID) pins, and the power supply standard of the CPU conforms to a first standard. The power supply system includes a VID signal line set and a core voltage controller. The VID signal line set is coupled to the VID pins of the CPU, wherein the VID signal line set includes a least significant bit (LSB) signal line set and a most significant bit (MSB) signal line set. The core voltage controller conforms to a second standard and is coupled to the MSB signal line set to determine the core voltage to be output to the CPU according to the bit state of each MSB signal line in the MSB signal line set, so that the power supply system can conform to the first standard.

9 Claims, 7 Drawing Sheets

| OUTPUT | VR11 DAC CODES: VIDSEL = HIGH | | | | | | | |
|---|---|---|---|---|---|---|---|---|
| | VID7 | VID6 | VID5 | VID4 | VID3 | VID2 | VID1 | VID0 |
| OFF | 0 | 0 | 0 | 0 | 0 | 0 | 0 | 0 |
| OFF | 0 | 0 | 0 | 0 | 0 | 0 | 0 | 1 |
| 1.60000 | 0 | 0 | 0 | 0 | 0 | 0 | 1 | 0 |
| 1.59375 | 0 | 0 | 0 | 0 | 0 | 0 | 1 | 1 |
| 1.58750 | 0 | 0 | 0 | 0 | 0 | 1 | 0 | 0 |
| 1.58125 | 0 | 0 | 0 | 0 | 0 | 1 | 0 | 1 |
| 1.57500 | 0 | 0 | 0 | 0 | 0 | 1 | 1 | 0 |
| 1.56875 | 0 | 0 | 0 | 0 | 0 | 1 | 1 | 1 |
| 1.56250 | 0 | 0 | 0 | 0 | 1 | 0 | 0 | 0 |
| 1.55625 | 0 | 0 | 0 | 0 | 1 | 0 | 0 | 1 |
| 1.55000 | 0 | 0 | 0 | 0 | 1 | 0 | 1 | 0 |
| 1.54375 | 0 | 0 | 0 | 0 | 1 | 0 | 1 | 1 |
| 1.53750 | 0 | 0 | 0 | 0 | 1 | 1 | 0 | 0 |
| 1.53125 | 0 | 0 | 0 | 0 | 1 | 1 | 0 | 1 |
| 1.52500 | 0 | 0 | 0 | 0 | 1 | 1 | 1 | 0 |
| 1.51875 | 0 | 0 | 0 | 0 | 1 | 1 | 1 | 1 |
| 1.51250 | 0 | 0 | 0 | 1 | 0 | 0 | 0 | 0 |
| 1.50625 | 0 | 0 | 0 | 1 | 0 | 0 | 0 | 1 |
| 1.50000 | 0 | 0 | 0 | 1 | 0 | 0 | 1 | 0 |
| 1.49375 | 0 | 0 | 0 | 1 | 0 | 0 | 1 | 1 |
| 1.48750 | 0 | 0 | 0 | 1 | 0 | 1 | 0 | 0 |
| 1.48125 | 0 | 0 | 0 | 1 | 0 | 1 | 0 | 1 |
| 1.47500 | 0 | 0 | 0 | 1 | 0 | 1 | 1 | 0 |
| 1.46875 | 0 | 0 | 0 | 1 | 0 | 1 | 1 | 1 |
| 1.46250 | 0 | 0 | 0 | 1 | 1 | 0 | 0 | 0 |
| 1.45625 | 0 | 0 | 0 | 1 | 1 | 0 | 0 | 1 |
| 1.45000 | 0 | 0 | 0 | 1 | 1 | 0 | 1 | 0 |
| 1.44375 | 0 | 0 | 0 | 1 | 1 | 0 | 1 | 1 |
| 1.43750 | 0 | 0 | 0 | 1 | 1 | 1 | 0 | 0 |
| 1.43125 | 0 | 0 | 0 | 1 | 1 | 1 | 0 | 1 |
| 1.42500 | 0 | 0 | 0 | 1 | 1 | 1 | 1 | 0 |
| 1.41875 | 0 | 0 | 0 | 1 | 1 | 1 | 1 | 1 |
| 1.41250 | 0 | 0 | 1 | 0 | 0 | 0 | 0 | 0 |
| 1.40625 | 0 | 0 | 1 | 0 | 0 | 0 | 0 | 1 |
| 1.40000 | 0 | 0 | 1 | 0 | 0 | 0 | 1 | 0 |
| 1.39375 | 0 | 0 | 1 | 0 | 0 | 0 | 1 | 1 |
| 1.38750 | 0 | 0 | 1 | 0 | 0 | 1 | 0 | 0 |
| 1.38125 | 0 | 0 | 1 | 0 | 0 | 1 | 0 | 1 |
| 1.37500 | 0 | 0 | 1 | 0 | 0 | 1 | 1 | 0 |
| 1.36875 | 0 | 0 | 1 | 0 | 0 | 1 | 1 | 1 |
| 1.36250 | 0 | 0 | 1 | 0 | 1 | 0 | 0 | 0 |
| 1.35625 | 0 | 0 | 1 | 0 | 1 | 0 | 0 | 1 |
| 1.35000 | 0 | 0 | 1 | 0 | 1 | 0 | 1 | 0 |
| 1.34375 | 0 | 0 | 1 | 0 | 1 | 0 | 1 | 1 |
| 1.33750 | 0 | 0 | 1 | 0 | 1 | 1 | 0 | 0 |
| 1.33125 | 0 | 0 | 1 | 0 | 1 | 1 | 0 | 1 |
| 1.32500 | 0 | 0 | 1 | 0 | 1 | 1 | 1 | 0 |
| 1.31875 | 0 | 0 | 1 | 0 | 1 | 1 | 1 | 1 |
| 1.31250 | 0 | 0 | 1 | 1 | 0 | 0 | 0 | 0 |
| 1.30625 | 0 | 0 | 1 | 1 | 0 | 0 | 0 | 1 |
| 1.30000 | 0 | 0 | 1 | 1 | 0 | 0 | 1 | 0 |
| 1.29375 | 0 | 0 | 1 | 1 | 0 | 0 | 1 | 1 |
| 1.28750 | 0 | 0 | 1 | 1 | 0 | 1 | 0 | 0 |
| 1.28125 | 0 | 0 | 1 | 1 | 0 | 1 | 0 | 1 |
| 1.27500 | 0 | 0 | 1 | 1 | 0 | 1 | 1 | 0 |
| 1.26875 | 0 | 0 | 1 | 1 | 0 | 1 | 1 | 1 |

FIG. 4 (PRIOR ART)

| | VR11 DAC CODES: VIDSEL = HIGH | | | | | | | |
|---|---|---|---|---|---|---|---|---|
| OUTPUT | VID7 | VID6 | VID5 | VID4 | VID3 | VID2 | VID1 | VID0 |
| 1.26250 | 0 | 0 | 1 | 1 | 1 | 0 | 0 | 0 |
| 1.25625 | 0 | 0 | 1 | 1 | 1 | 0 | 0 | 1 |
| 1.25000 | 0 | 0 | 1 | 1 | 1 | 0 | 1 | 0 |
| 1.24375 | 0 | 0 | 1 | 1 | 1 | 0 | 1 | 1 |
| 1.23750 | 0 | 0 | 1 | 1 | 1 | 1 | 0 | 0 |
| 1.23125 | 0 | 0 | 1 | 1 | 1 | 1 | 0 | 1 |
| 1.22500 | 0 | 0 | 1 | 1 | 1 | 1 | 1 | 0 |
| 1.21875 | 0 | 0 | 1 | 1 | 1 | 1 | 1 | 1 |
| 1.21250 | 0 | 1 | 0 | 0 | 0 | 0 | 0 | 0 |
| 1.20625 | 0 | 1 | 0 | 0 | 0 | 0 | 0 | 1 |
| 1.20000 | 0 | 1 | 0 | 0 | 0 | 0 | 1 | 0 |
| 1.19375 | 0 | 1 | 0 | 0 | 0 | 0 | 1 | 1 |
| 1.18750 | 0 | 1 | 0 | 0 | 0 | 1 | 0 | 0 |
| 1.18125 | 0 | 1 | 0 | 0 | 0 | 1 | 0 | 1 |
| 1.17500 | 0 | 1 | 0 | 0 | 0 | 1 | 1 | 0 |
| 1.16875 | 0 | 1 | 0 | 0 | 0 | 1 | 1 | 1 |
| 1.16250 | 0 | 1 | 0 | 0 | 1 | 0 | 0 | 0 |
| 1.15625 | 0 | 1 | 0 | 0 | 1 | 0 | 0 | 1 |
| 1.15000 | 0 | 1 | 0 | 0 | 1 | 0 | 1 | 0 |
| 1.14375 | 0 | 1 | 0 | 0 | 1 | 0 | 1 | 1 |
| 1.13750 | 0 | 1 | 0 | 0 | 1 | 1 | 0 | 0 |
| 1.13125 | 0 | 1 | 0 | 0 | 1 | 1 | 0 | 1 |
| 1.12500 | 0 | 1 | 0 | 0 | 1 | 1 | 1 | 0 |
| 1.11875 | 0 | 1 | 0 | 0 | 1 | 1 | 1 | 1 |
| 1.11250 | 0 | 1 | 0 | 1 | 0 | 0 | 0 | 0 |
| 1.10625 | 0 | 1 | 0 | 1 | 0 | 0 | 0 | 1 |
| 1.10000 | 0 | 1 | 0 | 1 | 0 | 0 | 1 | 0 |
| 1.09375 | 0 | 1 | 0 | 1 | 0 | 0 | 1 | 1 |
| OFF | N/A | | | | | | | |
| OFF | N/A | | | | | | | |
| OFF | N/A | | | | | | | |
| OFF | N/A | | | | | | | |
| 1.08750 | 0 | 1 | 0 | 1 | 0 | 1 | 0 | 0 |
| 1.08125 | 0 | 1 | 0 | 1 | 0 | 1 | 0 | 1 |
| 1.07500 | 0 | 1 | 0 | 1 | 0 | 1 | 1 | 0 |
| 1.06875 | 0 | 1 | 0 | 1 | 0 | 1 | 1 | 1 |
| 1.06250 | 0 | 1 | 0 | 1 | 1 | 0 | 0 | 0 |
| 1.05625 | 0 | 1 | 0 | 1 | 1 | 0 | 0 | 1 |
| 1.05000 | 0 | 1 | 0 | 1 | 1 | 0 | 1 | 0 |
| 1.04375 | 0 | 1 | 0 | 1 | 1 | 0 | 1 | 1 |
| 1.03750 | 0 | 1 | 0 | 1 | 1 | 1 | 0 | 0 |
| 1.03125 | 0 | 1 | 0 | 1 | 1 | 1 | 0 | 1 |
| 1.02500 | 0 | 1 | 0 | 1 | 1 | 1 | 1 | 0 |
| 1.01875 | 0 | 1 | 0 | 1 | 1 | 1 | 1 | 1 |
| 1.01250 | 0 | 1 | 1 | 0 | 0 | 0 | 0 | 0 |
| 1.00625 | 0 | 1 | 1 | 0 | 0 | 0 | 0 | 1 |
| 1.00000 | 0 | 1 | 1 | 0 | 0 | 0 | 1 | 0 |
| 0.99375 | 0 | 1 | 1 | 0 | 0 | 0 | 1 | 1 |
| 0.98750 | 0 | 1 | 1 | 0 | 0 | 1 | 0 | 0 |
| 0.98125 | 0 | 1 | 1 | 0 | 0 | 1 | 0 | 1 |
| 0.97500 | 0 | 1 | 1 | 0 | 0 | 1 | 1 | 0 |
| 0.96875 | 0 | 1 | 1 | 0 | 0 | 1 | 1 | 1 |
| 0.96250 | 0 | 1 | 1 | 0 | 1 | 0 | 0 | 0 |
| 0.95625 | 0 | 1 | 1 | 0 | 1 | 0 | 0 | 1 |
| 0.95000 | 0 | 1 | 1 | 0 | 1 | 0 | 1 | 0 |

FIG. 4 (CONT. 1)(PRIOR ART)

| OUTPUT | VR11 DAC CODES: VIDSEL = HIGH ||||||||
|---|---|---|---|---|---|---|---|---|
| | VID7 | VID6 | VID5 | VID4 | VID3 | VID2 | VID1 | VID0 |
| 0.94375 | 0 | 1 | 1 | 0 | 1 | 0 | 1 | 1 |
| 0.93750 | 0 | 1 | 1 | 0 | 1 | 1 | 0 | 0 |
| 0.93125 | 0 | 1 | 1 | 0 | 1 | 1 | 0 | 1 |
| 0.92500 | 0 | 1 | 1 | 0 | 1 | 1 | 1 | 0 |
| 0.91875 | 0 | 1 | 1 | 0 | 1 | 1 | 1 | 1 |
| 0.91250 | 0 | 1 | 1 | 1 | 0 | 0 | 0 | 0 |
| 0.90625 | 0 | 1 | 1 | 1 | 0 | 0 | 0 | 1 |
| 0.90000 | 0 | 1 | 1 | 1 | 0 | 0 | 1 | 0 |
| 0.89375 | 0 | 1 | 1 | 1 | 0 | 0 | 1 | 1 |
| 0.88750 | 0 | 1 | 1 | 1 | 0 | 1 | 0 | 0 |
| 0.88125 | 0 | 1 | 1 | 1 | 0 | 1 | 0 | 1 |
| 0.87500 | 0 | 1 | 1 | 1 | 0 | 1 | 1 | 0 |
| 0.86875 | 0 | 1 | 1 | 1 | 0 | 1 | 1 | 1 |
| 0.86250 | 0 | 1 | 1 | 1 | 1 | 0 | 0 | 0 |
| 0.85625 | 0 | 1 | 1 | 1 | 1 | 0 | 0 | 1 |
| 0.85000 | 0 | 1 | 1 | 1 | 1 | 0 | 1 | 0 |
| 0.84375 | 0 | 1 | 1 | 1 | 1 | 0 | 1 | 1 |
| 0.83750 | 0 | 1 | 1 | 1 | 1 | 1 | 0 | 0 |
| 0.83125 | 0 | 1 | 1 | 1 | 1 | 1 | 0 | 1 |
| 0.82500 | 0 | 1 | 1 | 1 | 1 | 1 | 1 | 0 |
| 0.81875 | 0 | 1 | 1 | 1 | 1 | 1 | 1 | 1 |
| 0.81250 | 1 | 0 | 0 | 0 | 0 | 0 | 0 | 0 |
| 0.80625 | 1 | 0 | 0 | 0 | 0 | 0 | 0 | 1 |
| 0.80000 | 1 | 0 | 0 | 0 | 0 | 0 | 1 | 0 |
| 0.79375 | 1 | 0 | 0 | 0 | 0 | 0 | 1 | 1 |
| 0.78750 | 1 | 0 | 0 | 0 | 0 | 1 | 0 | 0 |
| 0.78125 | 1 | 0 | 0 | 0 | 0 | 1 | 0 | 1 |
| 0.77500 | 1 | 0 | 0 | 0 | 0 | 1 | 1 | 0 |
| 0.76875 | 1 | 0 | 0 | 0 | 0 | 1 | 1 | 1 |
| 0.76250 | 1 | 0 | 0 | 0 | 1 | 0 | 0 | 0 |
| 0.75625 | 1 | 0 | 0 | 0 | 1 | 0 | 0 | 1 |
| 0.75000 | 1 | 0 | 0 | 0 | 1 | 0 | 1 | 0 |
| 0.74375 | 1 | 0 | 0 | 0 | 1 | 0 | 1 | 1 |
| 0.73750 | 1 | 0 | 0 | 0 | 1 | 1 | 0 | 0 |
| 0.73125 | 1 | 0 | 0 | 0 | 1 | 1 | 0 | 1 |
| 0.72500 | 1 | 0 | 0 | 0 | 1 | 1 | 1 | 0 |
| 0.71875 | 1 | 0 | 0 | 0 | 1 | 1 | 1 | 1 |
| 0.71250 | 1 | 0 | 0 | 1 | 0 | 0 | 0 | 0 |
| 0.70625 | 1 | 0 | 0 | 1 | 0 | 0 | 0 | 1 |
| 0.70000 | 1 | 0 | 0 | 1 | 0 | 0 | 1 | 0 |
| 0.69375 | 1 | 0 | 0 | 1 | 0 | 0 | 1 | 1 |
| 0.68750 | 1 | 0 | 0 | 1 | 0 | 1 | 0 | 0 |
| 0.68125 | 1 | 0 | 0 | 1 | 0 | 1 | 0 | 1 |
| 0.67500 | 1 | 0 | 0 | 1 | 0 | 1 | 1 | 0 |
| 0.66875 | 1 | 0 | 0 | 1 | 0 | 1 | 1 | 1 |
| 0.66250 | 1 | 0 | 0 | 1 | 1 | 0 | 0 | 0 |
| 0.65625 | 1 | 0 | 0 | 1 | 1 | 0 | 0 | 1 |
| 0.65000 | 1 | 0 | 0 | 1 | 1 | 0 | 1 | 0 |
| 0.64375 | 1 | 0 | 0 | 1 | 1 | 0 | 1 | 1 |
| 0.63750 | 1 | 0 | 0 | 1 | 1 | 1 | 0 | 0 |
| 0.63125 | 1 | 0 | 0 | 1 | 1 | 1 | 0 | 1 |
| 0.62500 | 1 | 0 | 0 | 1 | 1 | 1 | 1 | 0 |
| 0.61875 | 1 | 0 | 0 | 1 | 1 | 1 | 1 | 1 |
| 0.61250 | 1 | 0 | 1 | 0 | 0 | 0 | 0 | 0 |
| 0.60625 | 1 | 0 | 1 | 0 | 0 | 0 | 0 | 1 |

FIG. 4 (CONT. 2)(PRIOR ART)

| OUTPUT | VR11 DAC CODES: VIDSEL = HIGH ||||||||
|---|---|---|---|---|---|---|---|---|
| | VID7 | VID6 | VID5 | VID4 | VID3 | VID2 | VID1 | VID0 |
| 0.60000 | 1 | 0 | 1 | 0 | 0 | 0 | 1 | 0 |
| 0.59375 | 1 | 0 | 1 | 0 | 0 | 0 | 1 | 1 |
| 0.58750 | 1 | 0 | 1 | 0 | 0 | 1 | 0 | 0 |
| 0.58125 | 1 | 0 | 1 | 0 | 0 | 1 | 0 | 1 |
| 0.57500 | 1 | 0 | 1 | 0 | 0 | 1 | 1 | 0 |
| 0.56875 | 1 | 0 | 1 | 0 | 0 | 1 | 1 | 1 |
| 0.56250 | 1 | 0 | 1 | 0 | 1 | 0 | 0 | 0 |
| 0.55625 | 1 | 0 | 1 | 0 | 1 | 0 | 0 | 1 |
| 0.55000 | 1 | 0 | 1 | 0 | 1 | 0 | 1 | 0 |
| 0.54375 | 1 | 0 | 1 | 0 | 1 | 0 | 1 | 1 |
| 0.53750 | 1 | 0 | 1 | 0 | 1 | 1 | 0 | 0 |
| 0.53125 | 1 | 0 | 1 | 0 | 1 | 1 | 0 | 1 |
| 0.52500 | 1 | 0 | 1 | 0 | 1 | 1 | 1 | 0 |
| 0.51875 | 1 | 0 | 1 | 0 | 1 | 1 | 1 | 1 |
| 0.51250 | 1 | 0 | 1 | 1 | 0 | 0 | 0 | 0 |
| 0.50625 | 1 | 0 | 1 | 1 | 0 | 0 | 0 | 1 |
| 0.50000 | 1 | 0 | 1 | 1 | 0 | 0 | 1 | 0 |
| OFF | 1 | 1 | 1 | 1 | 1 | 1 | 1 | 0 |
| OFF | 1 | 1 | 1 | 1 | 1 | 1 | 1 | 1 |

FIG. 4 (CONT. 3)(PRIOR ART)

| VID4 | VID3 | VID2 | VID1 | VID0 | Output |
|---|---|---|---|---|---|
| 1 | 1 | 1 | 1 | 1 | No CPU |
| 1 | 1 | 1 | 1 | 0 | 0.800 V |
| 1 | 1 | 1 | 0 | 1 | 0.825 V |
| 1 | 1 | 1 | 0 | 0 | 0.850 V |
| 1 | 1 | 0 | 1 | 1 | 0.875 V |
| 1 | 1 | 0 | 1 | 0 | 0.900 V |
| 1 | 1 | 0 | 0 | 1 | 0.925 V |
| 1 | 1 | 0 | 0 | 0 | 0.950 V |
| 1 | 0 | 1 | 1 | 1 | 0.975 V |
| 1 | 0 | 1 | 1 | 0 | 1.000 V |
| 1 | 0 | 1 | 0 | 1 | 1.025 V |
| 1 | 0 | 1 | 0 | 0 | 1.050 V |
| 1 | 0 | 0 | 1 | 1 | 1.075 V |
| 1 | 0 | 0 | 1 | 0 | 1.100 V |
| 1 | 0 | 0 | 0 | 1 | 1.125 V |
| 1 | 0 | 0 | 0 | 0 | 1.150 V |
| 0 | 1 | 1 | 1 | 1 | 1.175 V |
| 0 | 1 | 1 | 1 | 0 | 1.200 V |
| 0 | 1 | 1 | 0 | 1 | 1.225 V |
| 0 | 1 | 1 | 0 | 0 | 1.250 V |
| 0 | 1 | 0 | 1 | 1 | 1.275 V |
| 0 | 1 | 0 | 1 | 0 | 1.300 V |
| 0 | 1 | 0 | 0 | 1 | 1.325 V |
| 0 | 1 | 0 | 0 | 0 | 1.350 V |
| 0 | 0 | 1 | 1 | 1 | 1.375 V |
| 0 | 0 | 1 | 1 | 0 | 1.400 V |
| 0 | 0 | 1 | 0 | 1 | 1.425 V |
| 0 | 0 | 1 | 0 | 0 | 1.450 V |
| 0 | 0 | 0 | 1 | 1 | 1.475 V |
| 0 | 0 | 0 | 1 | 0 | 1.500 V |
| 0 | 0 | 0 | 0 | 1 | 1.525 V |
| 0 | 0 | 0 | 0 | 0 | 1.550 V |

FIG. 5 (PRIOR ART)

POWER SUPPLY SYSTEM FOR CPU WHERE AN OLD GENERATION CPU CONFORMS TO A SECOND STANDARD AND A NEW GENERATION CPU CONFORMS TO A FIRST STANDARD

CROSS-REFERENCE TO RELATED APPLICATION

This application claims the priority benefit of Taiwan application serial no. 95122900, filed Jun. 9, 2006. All disclosure of the Taiwan application is incorporated herein by reference.

BACKGROUND OF THE INVENTION

1. Field of the Invention

The present invention relates to a power supply system. More particularly, the present invention relates to a power supply system for CPU.

2. Description of Related Art

In a computer system, the operating voltage required by the central process unit (CPU) is determined by the dynamic voltage identification code (VID) produced based on the operation mode of the CPU.

FIG. 1 is a block diagram illustrating providing operating voltage to a CPU in the prior art. The operating voltage required by the CPU 101 is not constant all the time. For example, when the CPU 101 enters power saving mode, the operating voltage required is lower than that required when the CPU 191 runs normally. Thus, a dynamic VID is produced by the CPU 101 according to the required operating voltage $V_{Core}$. Referring to FIG. 1, after producing the dynamic VID, the CPU 101 outputs the dynamic VID to a core voltage controller 103, and then the core voltage controller 103 determines the operating voltage $V_{Core}$ to be provided to the CPU 101 according to the dynamic VID.

However, a new standard will be established to the power supply specification of a new generation CPU by the CPU manufacturer such as Intel company when the new generation CPU is introduced to the market. Thus, the power supply circuit of CPU has to be adjusted almost every year and the variation range thereof varies. The design standard of a new generation CPU is only provided to a few contractors before the CPU is brought into the market by the manufacturer, so that only a few contractors can provide parts supporting the new generation CPU after the CPU has been brought into the market. These parts vendors are not willing to reduce the prices of the products since demand exceeds supply, thus the customers have to pay more money to enjoy the benefit brought by the new technology.

As to those parts vendors who do not sign contract with the CPU manufacturer, the design standard can only be obtained and new parts can only be developed after the new generation CPU and the power supply standard thereof are launched, thus, such vendors fall far behind the contracted vendors and lose many business opportunities. Those manufacturers using the parts of such specification have to bear either the high cost of synchronous development or lose many business opportunities.

SUMMARY OF THE INVENTION

Accordingly, the present invention is directed to provide a power supply system for central process unit (CPU) for resolving the problems in conventional technology.

The present invention provides a power supply system for CPU. The CPU includes a plurality of dynamic voltage identification (VID) pins, and the power supply standard of the CPU conforms to a first standard. The power supply system includes a dynamic VID signal line set and a core voltage controller. The dynamic VID signal line set is coupled to the dynamic VID pins of the CPU, wherein the dynamic VID signal line set includes a least significant bit (LSB) signal line set and a most significant bit (MSB) signal line set. The core voltage controller, conforming to a second standard, is coupled to the MSB signal line set to determine the core voltage to be output to the CPU according to the bit state of each MSB signal line in the MSB signal line set so that the core voltage controller can conform to the first standard.

According to a power supply system for CPU in an exemplary embodiment of the present invention, the core voltage controller includes a first reference voltage generator, a pulse width modulator, and a core voltage driver. The first reference voltage generator is coupled to the MSB signal line set for receiving the MSB in a dynamic VID signal output by the CPU and outputs a first reference voltage according to the second standard. The reference voltage terminal of the pulse width modulator is coupled to the first reference voltage generator and receives the first reference voltage. The pulse width modulator outputs a pulse width modulation signal according to the voltage received by the reference voltage terminal thereof. The core voltage driver is coupled to the pulse width modulator to output and determine the core voltage according to the length of the duty cycle of the pulse width modulation signal.

According to a power supply system for CPU in an exemplary embodiment of the present invention, when the maximum value of the reference voltage cannot reach a rated value set by the first standard, the reference voltage generator further includes a virtual ground of the reference voltage, and the core voltage controller further includes a voltage supply device coupled to the virtual ground of the reference voltage to provide a predetermined voltage so that the maximum value of the reference voltage conforms to the foregoing rated value.

According to a power supply system for CPU in an exemplary embodiment of the present invention, the core voltage controller further includes a second reference voltage generator and a switching component. The second reference voltage generator is coupled to the dynamic VID signal line set to receive a dynamic VID signal output by the CPU and outputs a second reference voltage according to a third standard. The switching component is coupled to the first reference voltage generator, the second reference voltage generator, and the reference voltage terminal of the pulse width modulator. The switching component is connected to the circuit between the second reference voltage generator and the reference voltage terminal when the CPU conforms to the third standard.

According to a power supply system for CPU in an exemplary embodiment of the present invention, the foregoing first standard is VRM standard and the foregoing second standard is K8 standard, which respectively specify the relationships between the bit signals output by the dynamic VID pins and the core voltage.

The present invention is mainly to provide a resolution to the problems in conventional technology, wherein the core voltage controller of an old generation CPU is applied to a new generation CPU. The core voltage controller conforms to a second standard and the new generation CPU conforms to a first standard. Moreover, some of the dynamic VID pins in the new generation CPU which match the dynamic VID pins of the old generation CPU are coupled to the foregoing core voltage controller. Since the foregoing core voltage controller has become mature product in the market and the cost of parts thereof is relatively lower, the speed of developing new products can be increased and the development cost of the new products can be reduced.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a table illustrating a dynamic VID conforming to VRM 11.0 standard corresponding to a reference voltage.

FIG. 5 is a table illustrating a dynamic VID conforming to K8 standard corresponding to a reference voltage.

DESCRIPTION OF EMBODIMENTS

Figure 1:
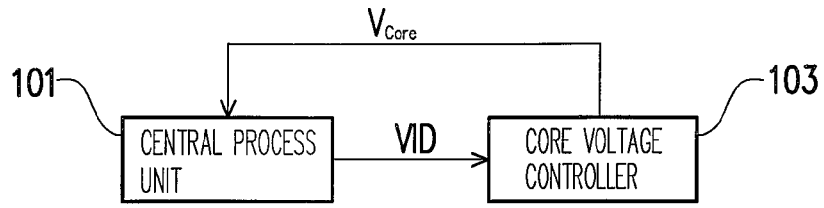
FIG. 1 is a block diagram illustrating providing operating voltage to a CPU in the prior art.
Figure 2:
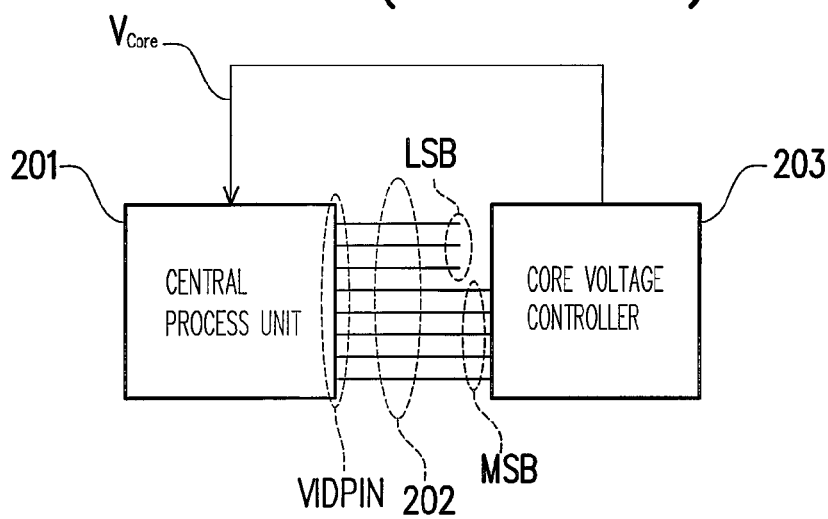
FIG. 2 is a diagram of a power supply system for a CPU according to an embodiment of the present invention.

FIG. 2 is a diagram of a power supply system for a central process unit (CPU) according to an exemplary embodiment of the present invention. The power supply system includes a CPU 201, a dynamic voltage identification (VID) signal line set 202, and a core voltage controller 203. In the present embodiment, the CPU 201 includes a plurality of dynamic VID pins VIDPIN, and the power supply standard of CPU 201 conforms to a first standard.

The foregoing dynamic VID signal line set 202 is coupled to the dynamic VID pins of the CPU 201, wherein the dynamic VID signal line set 202 includes a least significant bit (LSB) signal line set LSB and a most significant bit (MSB) signal line set MSB. The foregoing core voltage controller 203 conforms to a second standard and is coupled to the MSB signal line set MSB in the dynamic VID signal line set 202 to determine the core voltage $V_{Core}$ to be output to the CPU 201 according to the bit state of each MSB signal line in the MSB signal line set MSB, so that the core voltage controller 203 can conform to the first standard.

In the present embodiment, the foregoing first standard may be Intel VRM standard which specifies the relationship between the bit signals output by the dynamic VID pins and the core voltage. In the present embodiment, the foregoing second standard is K8 power supply specification standard which specifies the relationship between the bit signals output by the dynamic VID pins and the core voltage. The first and the second standards will be described in detail below.

It should be noted that even though a possible pattern of the power supply system for CPU has been described in the foregoing embodiment, it should be understood by those having ordinary skill in the art that different manufacturers have different designs of the core voltage controller 203, thus, the present invention should not be limited to the pattern of the power supply system described above. In other words, it falls within the spirit of the present invention as long as the second standard the core voltage controller 203 conforms to is different from the first standard the CPU 201 conforms to, and the first standard can be met by the core voltage controller 203 by coupling part of the pins of the CPU 201 to the core voltage controller 203.

Next, several embodiments of the present invention will be described.

Figure 3:
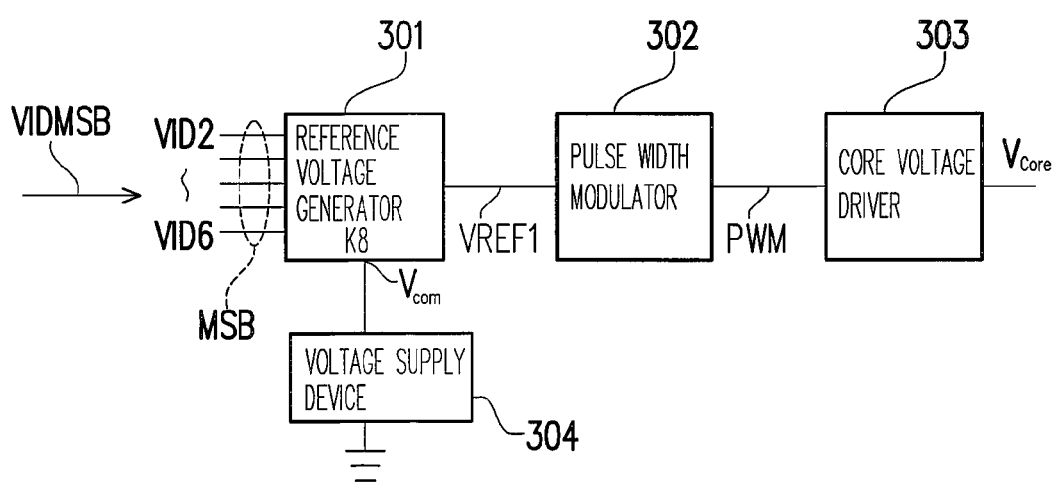
FIG. 3 is a diagram of a power supply system for a CPU according to an embodiment of the present invention.

FIG. 3 is a diagram of a power supply system for a CPU according to an embodiment of the present invention. Also refer to FIG. 2 for the description of the power supply system in the present embodiment. Referring to FIG. 3, in the power supply system, the core voltage controller 203 may include three parts, which are a reference voltage generator 301, a pulse width modulator 302, and a core voltage driver 303.

In the present embodiment, Intel VRM 11.0 is used as the first standard of the CPU 201, and FIG. 4 is a table illustrating part of the dynamic VID thereof corresponding to the reference voltage. Besides, in the present embodiment, AMD K8 power supply specification is used as the second standard of the core voltage controller 203, and FIG. 5 is a table illustrating the dynamic VID thereof corresponding to the reference voltage.

In the present embodiment, since VRM 11.0 is used as the first standard by the CPU 201 and AMD K8 power supply specification as the second standard of the core voltage controller 203, and the specifications of the two standards are different, the CPU 201 and the core voltage controller 203 cannot be directly coupled together through the dynamic VID signal line set 202.

Besides, the range of the voltage of VRM 11.0 is 0.500V~1.600V, and 8 dynamic VIDs (VID0~VID7) are adopted by VRM 11.0 for adjusting the voltage. The range of the voltage of AMD K8 power supply specification is 0.800V~1.550V, and 5 dynamic VIDs (VID0~VID4) are adopted by AMD K8 power supply specification for adjusting the voltage. Thus, some of the VID pins of the CPU 201 are not coupled to the core voltage controller 203 if the CPU 201 and the core voltage controller 203 are to be directly coupled.

In the present embodiment, to match the adjustable voltage range of the core voltage controller 203 and the adjustable voltage range of the CPU 201, connections between the core voltage controller 203 and the CPU 201 are adjusted and the core voltage controller 203 is processed correspondingly.

As to the existing CPUs, 0.500V~0.800V is seldom used. As to CPU 201 adopting VRM 11.0, the $8^{th}$ dynamic VID pin VIDPIN 7 is the corresponding control pin. Besides, the $1^{st}$ dynamic VID pin VIDPIN 0 of CPU 201 can control the voltage to be changed to 6.25 mV, and the $2^{nd}$ dynamic VID pin VIDPIN 1 thereof can control the voltage to be changed to 12.5 mV. However, such minor changes (6.25 mV and/or 12.5 mV) of the voltage will not affect the operation of the CPU much. Thus, in the present embodiment, as described above, the $1^{st}$, $2^{nd}$, and $8^{th}$ dynamic VID pins VIDPIN 0, VIDPIN 1, and VIDPIN 7 of the CPU 201 adopting VRM 11.0 are not coupled to the core voltage controller 203. Certainly, in other embodiments, at least one of the dynamic VID pins VIDPIN 0, VIDPIN 1, and VIDPIN 7 can be coupled to the core voltage controller 203.

Accordingly, in the present embodiment, the $1^{st}$ and the $2^{nd}$ dynamic VID pins VIDPIN 0 and VIDPIN 1 of the CPU 201 are coupled to the LSB signal line set LSB, and the LSB signal line set LSB is not coupled to the reference voltage generator 301 of the core voltage controller 203. Besides, the $3^{rd}$~$7^{th}$ dynamic VID pins VIDPIN 2~6 of the CPU 201 are coupled to the MSB signal line set MSB, and the MSB signal line set MSB is coupled to the reference voltage generator 301 of the core voltage controller 203. Accordingly, the core voltage controller 203 can determine the core voltage to be output to the CPU according to the bit state of each MSB signal line in the MSB signal line set MSB to conform to the first standard. In other embodiments, the MSB signal line set MSB can also be directly coupled to the core voltage controller 203.

Moreover, since K8 power supply specification is adopted by the reference voltage generator 301 of the core voltage controller 203 in the present embodiment, the voltage range provided by the reference voltage generator 301 itself is 0.800V~1.550V, that is, the maximum reference voltage provided by the reference voltage generator 301 is 1.550V, which cannot fulfill the maximum voltage (1.600V) of the CPU 201 adopting VRM 11.0.

To match the maximum voltage (1.600V) in VRM 11.0, in the present embodiment, a voltage supply device 304 is further coupled between the virtual ground (GND pin) of the reference voltage of the reference voltage generator 301 and the actual ground (GND), so that the reference voltage generator 301 can produce an output voltage based on the virtual ground $V_{com}$ of the reference voltage, and the voltage supply device 304 provides a predetermined voltage (for example, 0.050V) so that the maximum value of the reference voltage provided by the reference voltage generator 301 can be up to the rated value (i.e. 1.600V) specified in VRM11.0. In other words, the reference voltage generator 301 as a whole can adjust the voltage level to be increased up to 0.050V to meet the maximum voltage (1.600V) of VRM 11.0.

In the present embodiment, the voltage supply device 304 is accomplished by using a battery device, and in other embodiments, the voltage supply device 304 can be implemented with resistive voltage division or can be other voltage-increasing device.

As described above, the reference voltage generator 301 can receive the MSB VIDMSB in the dynamic VID signal output by the CPU 201 through the MSB signal line set MSB (VID2~VID6), and the reference voltage generator 301 can output a reference voltage VREF1 according to K8 power supply specification standard.

The reference voltage terminal of the pulse width modulator 302 is coupled to the reference voltage generator 301 for receiving the reference voltage VREF1, and the pulse width modulator 302 can output a pulse width modulation signal PWM according to the voltage received by the reference voltage terminal. The core voltage driver 303 is coupled to the pulse width modulator 302 and can output and determine the core voltage $V_{Core}$ according to the length of the duty cycle of the pulse width modulation signal PWM.

Figure 6:
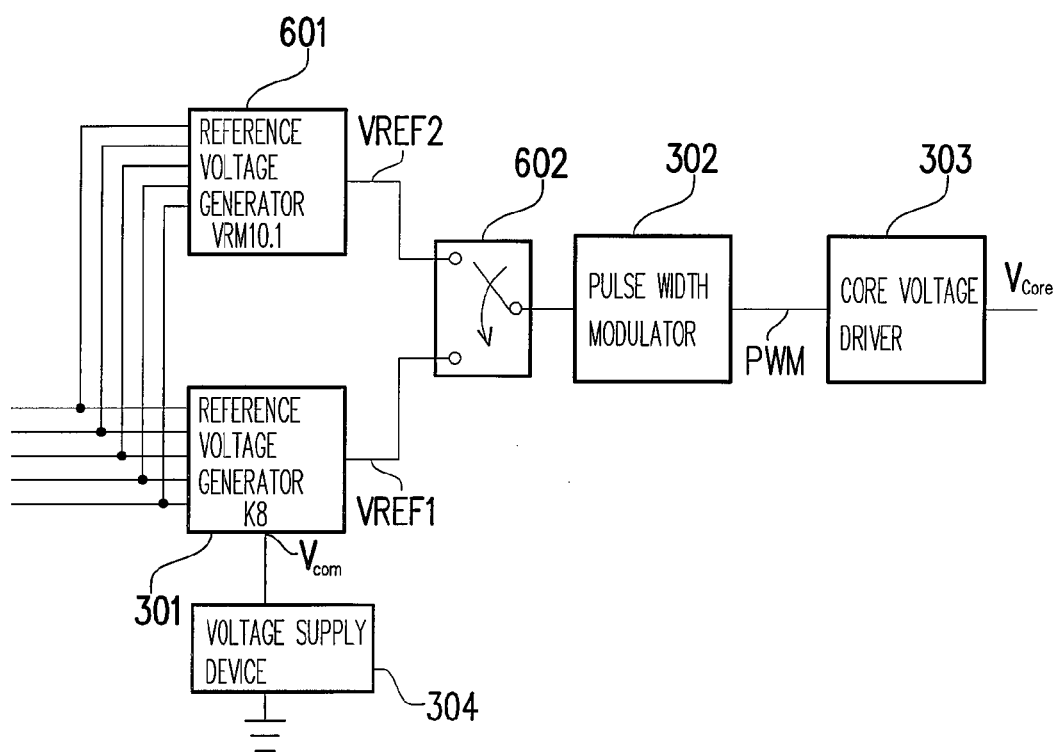
FIG. 6 is a diagram of a power supply system for a CPU according to an embodiment of the present invention.

FIG. 6 is a diagram of a power supply system for a CPU according to another exemplary embodiment of the present invention. The operation principle and components of the present embodiment are similar to those of the first exemplary embodiment, and the only difference is that a reference voltage generator 601 and a switching component 602 are further added to the system in FIG. 6. The reference voltage generator 601 in the present embodiment is used for, for example, producing a reference voltage VREF2 conforming to VRM 10.1 standard, and the reference voltage generator 601 is coupled to the dynamic VID signal line set 202 so that the reference voltage generator 601 can be coupled to the CPU through the dynamic VID signal line set 202 for receiving a dynamic VID signal output by the CPU and outputs a reference voltage according to VRM 10.1 standard. Wherein, the reference voltage output by the reference voltage generator 601 may be different from the reference voltage output by the reference voltage generator 301. In the present embodiment, the dynamic VID signal line set 202 coupled to the reference voltage generator 601 is the MSB signal line set, and here the number of the MSB signal lines may be different from that in the first embodiment, that is, in the present embodiment the number of MSB signal lines may be up to 7 to conform to VRM 10.1 standard (VID0~VID6).

The switching component 602 is coupled to the reference voltage generators 601, 301, and the reference voltage terminal of the pulse width modulator 302. When the CPU conforms to VRM 10.1 standard, the switching component 602 is controlled for connecting to the circuit between the reference voltage generator 601 and the reference voltage terminal. Accordingly, the power supply system is compatible to CPUs of different voltage specifications. In other words, the power supply system of the present embodiment is compatible to CPU of VRM 10.X power supply standard or CPU of VRM 11.0 power supply standard.

In overview, the present invention is mainly to provide a resolution to the problems in conventional technology by applying the core voltage controller of an old generation CPU to a new generation CPU. The core voltage controller conforms to a second standard and the new generation CPU conforms to a first standard of new generation. Moreover, some of the dynamic VID pins in the new generation CPU which match the dynamic VID pins of the old generation CPU are coupled to the core voltage controller. Since the foregoing core voltage controller has become mature product in the market and the cost of the parts thereof is relatively lower, the speed of developing new products can be increased and the development cost of the new products can be reduced, accordingly the products can be more competitive in the market.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply system for a central process unit (CPU), the CPU comprising a plurality of dynamic voltage identification (VID) pins, and the power supply standard of the CPU conforming to a first standard, the power supply system comprising:
   a dynamic VID signal line set, coupled to the dynamic VID pins of the CPU, wherein the dynamic VID signal line set comprises a least significant bit (LSB) signal line set and a most significant bit (MSB) signal line set; and
   a core voltage controller, conforming to a second standard, coupled to the MSB signal line set, determining the core voltage to be output to the CPU according to the bit state of each MSB signal line in the MSB signal line set to conform to the first standard.

2. The power supply system as claimed in claim 1, wherein the core voltage controller comprises:
   a first reference voltage generator, coupled to the MSB signal line set, receiving the MSB of a dynamic VID signal output by the CPU, and outputting a first reference voltage according to the second standard;
   a pulse width modulator, having a reference voltage terminal coupled to the first reference voltage generator and receiving the first reference voltage, outputting a pulse width modulation signal according to the voltage received by the reference voltage terminal; and
   a core voltage driver, coupled to the pulse width modulator, outputting and determining the core voltage according to the length of the duty cycle of the pulse width modulation signal.

3. The power supply system as claimed in claim 2, wherein when the maximum value of the reference voltage does not reach a rated value specified by the first standard, the reference voltage generator further comprises a virtual ground of the reference voltage, and the core voltage controller further comprises:

a voltage supply device, coupled to the virtual ground of the reference voltage, providing a predetermined voltage to make the maximum value of the reference voltage conform to the rated value.

4. The power supply system as claimed in claim 3, wherein the voltage supply device is accomplished by a battery device or by resistive voltage division, and the voltage produced by the voltage supply device is positive voltage or negative voltage.

5. The power supply system as claimed in claim 2, wherein the core voltage controller further comprises:

a second reference voltage generator, coupled to the dynamic VID signal line set to receive a dynamic VID signal output by the CPU, outputting a second reference voltage according to a third standard; and a switching component, coupled to the first reference voltage generator, the second reference voltage generator, and the reference voltage terminal of the pulse width modulator, the switching component being connected to the circuit between the second reference voltage generator and the reference voltage terminal when the CPU conforms to the third standard.

6. The power supply system as claimed in claim 1, wherein the first standard is VRM standard, which specifies the relationship between the bit signals output by the dynamic VID pins and the core voltage.

7. The power supply system as claimed in claim 1, wherein the second standard is K8 power supply specification standard, which specifies the relationship between the bit signals output by the dynamic VID pins and the core voltage.

8. The power supply system as claimed in claim 1, wherein the LSB signal line set is coupled to the first and the second dynamic VID pins of the CPU.

9. The power supply system as claimed in claim 1, wherein the MSB signal line set is coupled to the third, the fourth, the fifth, the sixth, and the seventh dynamic VID pins of the CPU.

* * * * *